United States Patent [19]
McMahan et al.

[11] Patent Number: 5,253,154
[45] Date of Patent: Oct. 12, 1993

[54] HEADLAMP LEVELING ARRANGEMENT

[75] Inventors: David R. McMahan; William E. Nagengast, both of Anderson; Terry L. Coombs, Pendleton; Bradley A. Merrill, Thorntown; Ronald A. Wheat, Alexandria; Jan A. Wisler, Anderson, all of Ind.

[73] Assignee: General Motors Corporation, Detroit, Mich.

[21] Appl. No.: 897,637

[22] Filed: Jun. 12, 1992

[51] Int. Cl.$^5$ ............................................. B60Q 1/00
[52] U.S. Cl. ...................................... 362/66; 362/61; 362/287; 362/427; 33/335; 33/379
[58] Field of Search ............... 362/61, 66, 418, 427, 362/428, 80, 287; 33/370, 379, 335

[56] References Cited
U.S. PATENT DOCUMENTS

| | | | |
|---|---|---|---|
| 2,058,743 | 10/1936 | Trippe | 362/311 |
| 4,660,128 | 4/1987 | Bergin et al. | 362/80 |
| 4,802,067 | 1/1989 | Ryder | 362/61 |
| 4,916,586 | 4/1990 | Van Duyn et al. | 362/61 |
| 4,970,629 | 11/1990 | McMahan | 362/61 |
| 5,029,051 | 7/1991 | Shirai et al. | 362/66 |
| 5,032,964 | 7/1991 | Endo et al. | 362/66 |
| 5,107,407 | 4/1992 | Collot et al. | 362/66 X |
| 5,140,503 | 8/1992 | Lisak | 362/80 X |
| 5,151,849 | 9/1992 | Nagengast et al. | 362/61 |

Primary Examiner—Carl D. Price
Attorney, Agent, or Firm—William A. Schuetz

[57] ABSTRACT

A leveling arrangement for a vehicle headlamp that includes a support portion formed in the upper portion of the reflector member that has a spirit level member mounted thereon which is characterized in that it includes a living hinge serving as a pivotal connection for a depending member fastened to a substantially vertically oriented surface of the support portion so that rotation of screw means carried by the spirit level results in pivotal movement and calibration of the spirit level relative to the optical axis of the reflector member.

8 Claims, 4 Drawing Sheets

HEADLAMP LEVELING ARRANGEMENT

BACKGROUND OF THE INVENTION

This invention concerns headlamps and, more particularly, a vehicle headlamp provided with an adjustable spirit level which allows the headlamp to be pre-aimed and afterwards installed in a vehicle for proper projection of the headlamp beam without requiring any special aiming equipment to be attached to the headlamp.

Copending patent application U.S. Ser. No. 07/740,743 entitled "Headlamp Leveling Arrangements", filed on Aug. 6, 1991 in the name of Nagengast et al and assigned to the assignee of this invention, discloses a leveling arrangement for a vehicle headlamp having a reflector housing provided with a reflector parallel to the optical axis of the reflector cavity. A retainer slot is formed in the upper portion of the reflector housing and is defined by a bottom wall, a top wall and a pair of side walls. A spirit level member, provided with a pair of outwardly extending legs, is mounted in the retainer slot by a spring clip, one end of which is fastened to the housing and to the spirit level member. A portion of of the spring clip is located in the slot between the top wall and the legs of the spirit level member for continuously biasing the other end of the spirit level member towards the bottom wall. In addition, screw means are threadably received by the spirit level member at the other end thereof and adapted to engage the bottom wall, whereby rotation of the screw means causes pivoted adjustment of the position of the spirit level member about the aforementioned one end thereof to thereby allow the spirit level member to be calibrated relative to the optical axis of the the reflector cavity.

SUMMARY OF THE INVENTION

The present invention is similar to the above-described leveling arrangement in that it also is fastened to the reflector and includes screw means which, upon rotation, cause the spirit level member to be calibrated relative to the optical axis of the reflector. However, one difference in the present invention over the above-described leveling arrangement is that a separate spring member is not required for biasing the spirit level member in a direction which allows the other end thereof to be adjusted in position by the screw means. Instead, the spirit level member of the present invention is provided with a depending member which is integral with and connected by a living hinge to one end of the main body portion of the spirit level member. In the preferred form, the depending member is fastened to a substantially vertically oriented surface of a support portion formed on the reflector housing. In this manner, the depending member acting through the living hinge, in effect, provides the biasing force against which the screw means acts to cause pivotal movement of the other end of the spirit level member for attaining the calibration referred to above. An additional feature of the present invention is the provision of light directing grooves formed on the bottom surface of the spirit level member. This feature allows the spirit level member to be positioned above a black-colored housing and still permit the spirit level bubble to be visible.

The objects of the present invention are to provide a new and improved leveling arrangement for a vehicle headlamp wherein the reflector housing has a spirit level member mounted thereon that has one end thereof connected by a living hinge to a depending member which allows calibration of the spirit level member relative to the optical axis of the headlamp upon rotation of screw means operatively associated with the other end of the spirit level member; to provide a new and improved leveling arrangement for a vehicle headlamp that includes a support portion formed on the upper portion of the reflector member that has a spirit level member mounted thereon that is characterized in that it includes a living hinge serving as a pivotal connection for a depending member which is fastened to a substantially vertically oriented surface of the support portion so that rotation of screw means carried by the spirit level member results in pivotal movement and calibration of the spirit level member relative to the optical axis of the reflector member; and to provide a new and improved leveling arrangement for a vehicle headlamp which includes a spirit level member mounted on a reflector member formed of or coated with a dark colored material and in which the bottom surface of the spirit level member is formed with a plurality of light directing surfaces which permit light rays to be reflected upwardly through the spirit level member so as to improve visibility of the spirit level gas bubble.

BRIEF DESCRIPTION OF THE DRAWINGS

Other objectives and advantages of the present invention will be apparent from the following detailed description when taken with the drawings in which.

DESCRIPTION OF THE PREFERRED EMBODIMENTS

Figure 1:
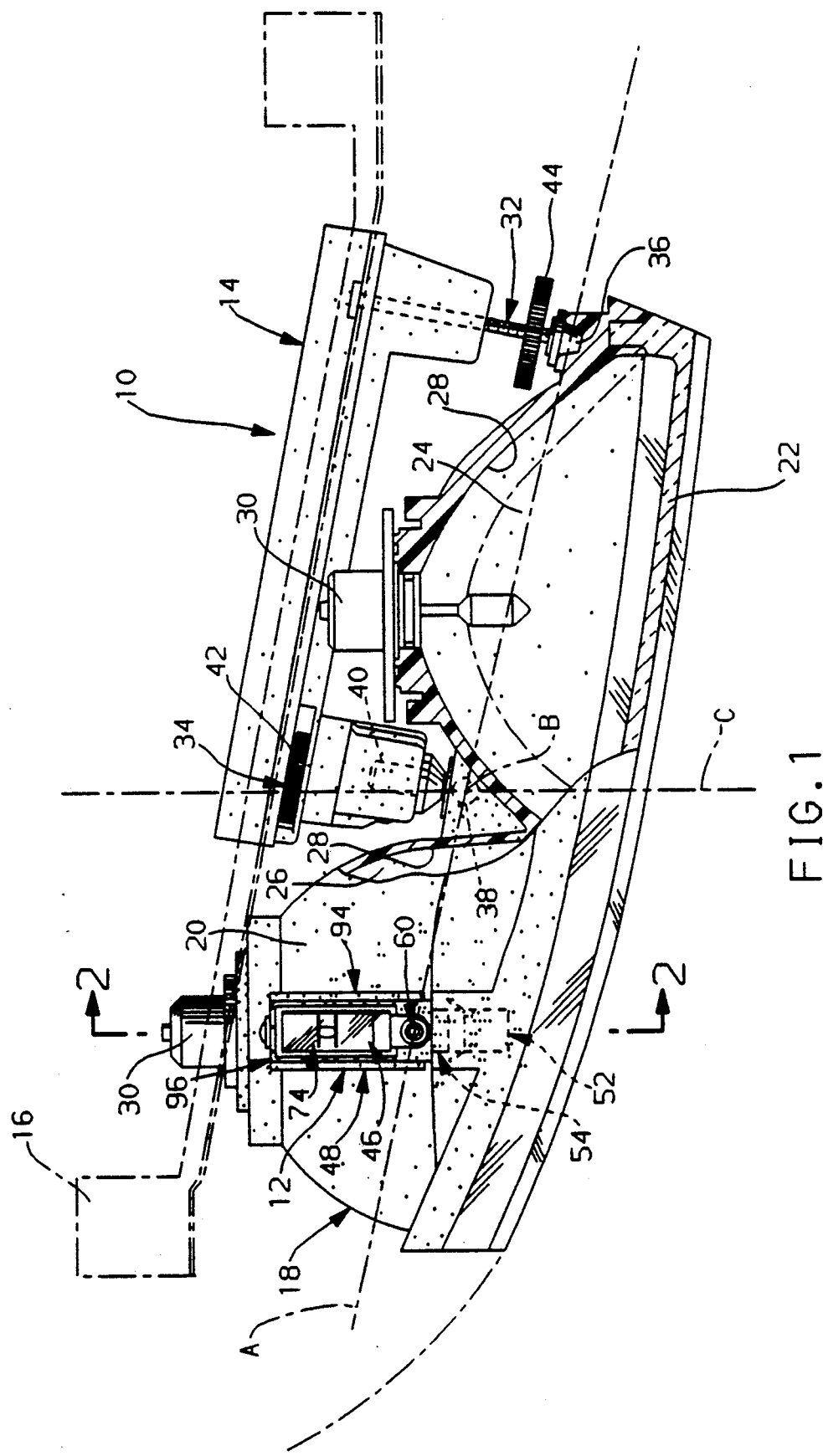
FIG. 1 is a plan view of a headlamp assembly incorporating a leveling arrangement made in accordance with the present invention.

Referring to the drawings and more particularly FIG. 1 thereof, a headlamp assembly 10 is shown of the replaceable light bulb composite type incorporating a leveling arrangement 12 made in accordance with the present invention. The headlamp assembly 10 includes a mounting bracket 14 secured to the sheet metal 16 of the front end of a motor vehicle that carries a headlamp body 18 for selective adjustable movement in a horizontal plane containing a horizontal aim axis A and in a vertical plane containing a substantially vertical aim axis B. The headlamp body 18 includes a plastic reflector member 20 enclosed by a glass or plastic clear lens 22 and formed with a pair of side-by-side parabolic cavities 24 and 26, the concave surface 28 of each of which is aluminized so as to project a light beam emanating from a light bulb 30 and substantially parallel to an axis C. It will be noted that as shown in FIG. 1, the axis C is parallel to the longitudinal center axis of the associated motor vehicle, and the headlamp assembly 10 would be the left hand unit when looking towards the front of the vehicle. As should be apparent, the angled position of the headlamp assembly is due to the rounded streamline front- end design which is currently popular with motor vehicles. Also, each light bulb 30 in the cavities 24 and 26 is provided with a single filament located so as to cause the associated parabolic reflective surface to project a light beam forwardly of the vehicle. The light bulb 30 in the cavity 26 allows the associated reflective surface to project a so-called "low beam" when energized while the light bulb 30 in the cavity 26 will project the so-called "high beam" when energized. Thus, the headlamp body 18 is actually two separate headlamps, a low beam unit and a high beam unit, joined together so as to facilitate aiming adjustment of both beams.

The mounting bracket 14 is identical in construction to the mounting bracket seen in U.S. Pat. No. 4,916,586 in the name of Van Duyn et al, entitled Apr. 10, 1990 and assigned to the assignee of this invention. Accordingly, reference is made to the '586 patent for a detailed description of how the mounting bracket 14 supports the headlamp body 18 for selective adjustment about the horizontal aim axis A and the vertical aim axis B. However, for present purposes, it will suffice to mention that the mounting bracket 14 includes a pair of laterally spaced adjustment mechanisms 32 and 34, each of which is connected to the headlamp body 18 through a ball pivot (such as ball pivot 36 associated with mechanism 32) and also includes a stationary ball pivot 38 integral with a stud 40 press fitted in the upper portion of the mounting bracket 14. In addition, proper aim of the headlamp body 18 can be realized by rotating a thumb wheel member 42 associated with adjustment mechanism 34 to position the headlamp body 18 about the horizontal aim axis A and by rotating a thumb wheel member 44 to position the headlamp body 18 about the vertical aim axis B.

Figure 2:
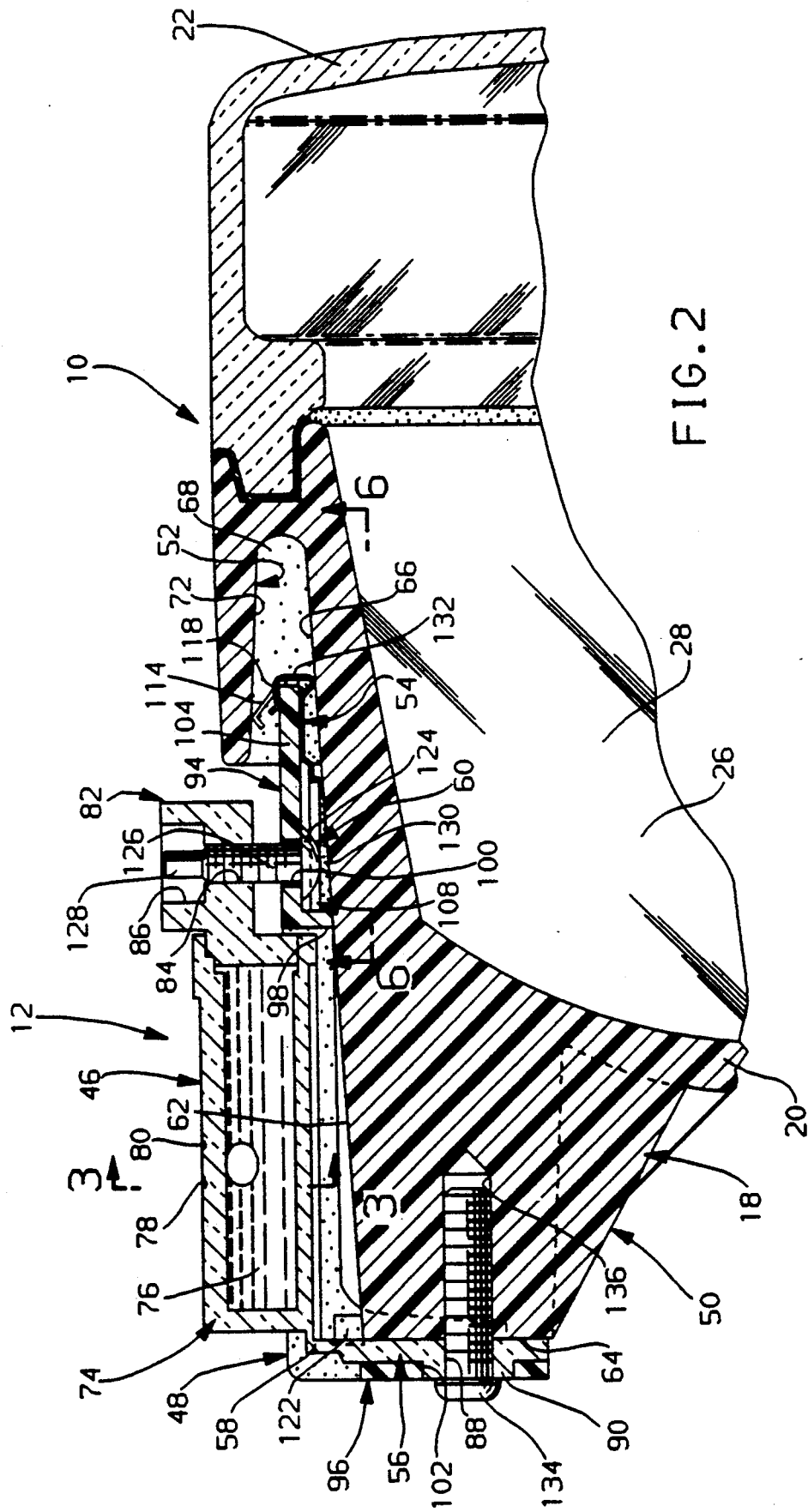
FIG. 2 is an enlarged sectional view of the leveling arrangement taken on line 2—2 of FIG. 1.
Figure 3:
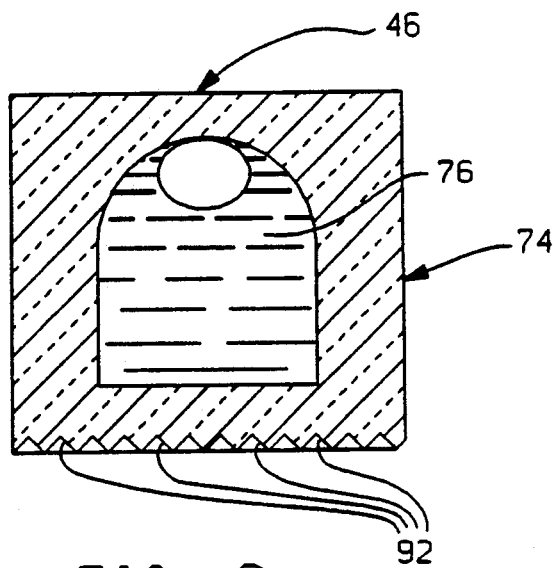
FIG. 3 is an cross sectional view taken on line 3—3 of the spirit level member which forms a part of leveling arrangement seen in FIG. 2.
Figure 4:
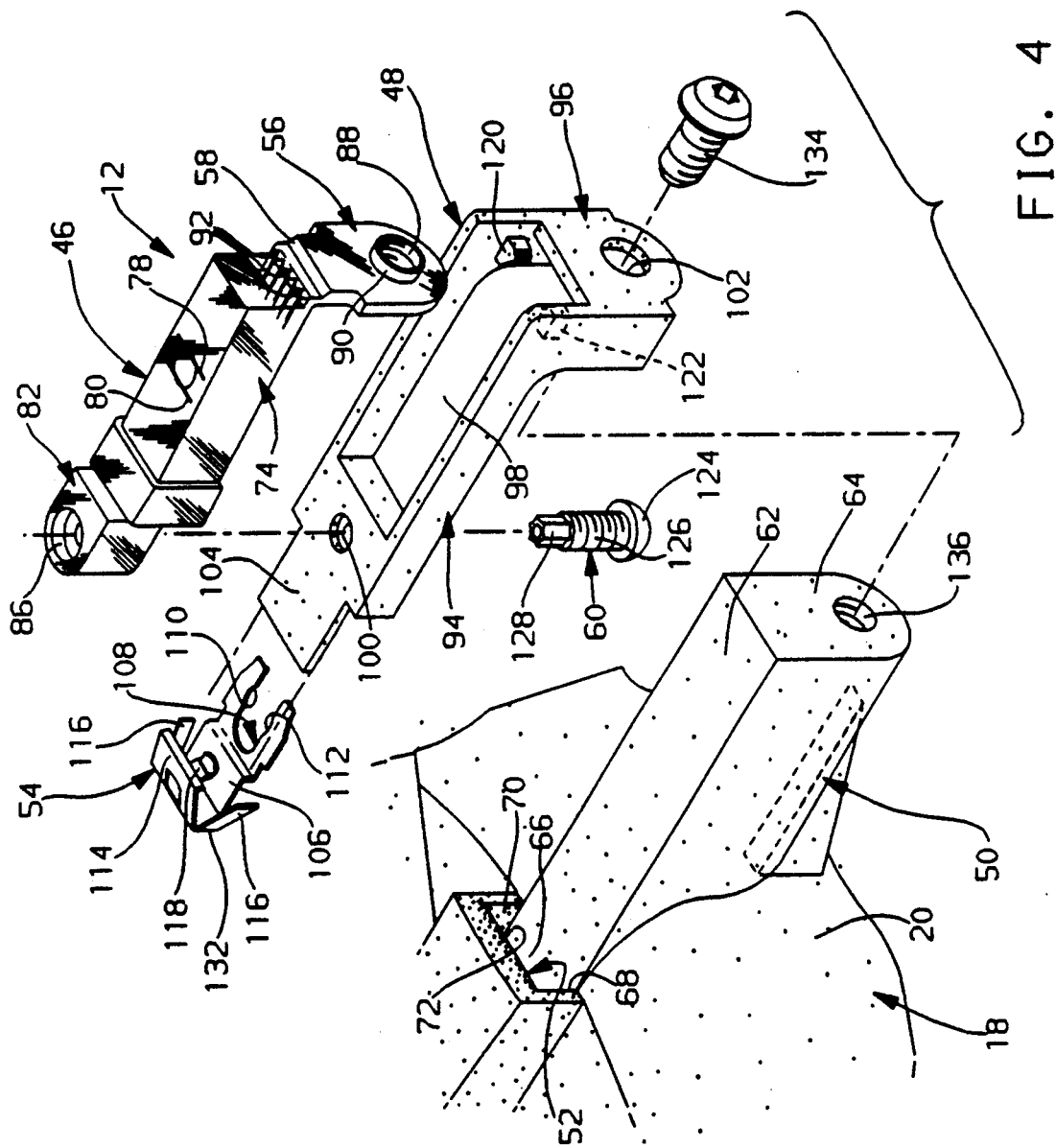
FIG. 4 is an exploded isometric view of the various parts of the leveling arrangement prior to assembly thereof.

As seen in FIGS. 2 through 4, the leveling arrangement 12 incorporated with the headlamp body 18 in general includes a spirit level member 46 that is mounted on an L-shaped carrier member 48 which, in turn, is connected to a support portion 50 integrally formed with the reflector member 20 and located in longitudinal alignment with a retainer slot 52. The forward end of the carrier member 48 is connected to a clip member 54 and extends into the retainer slot 52 while the rear end of the carrier member 48 together with a depending member 56 (connected to the spirit level member through a living hinge 58) is fastened to the support portion 50 of the reflector member 20. An adjustment screw 60 threadably carried by the spirit level member 46 serves to allow the position of the spirit level member 46 to be varied as will be more fully described hereinafter.

More specifically and as seen in FIGS. 2 and 4, the support portion 50 is located to the rear of the lens 22 and projects rearwardly outwardly from the retainer slot 52 of the reflector member 20. The support portion 50 is formed with a flat top surface 62 which is located in a substantially horizontal plane and terminates with a planar surface 64 located in a substantially vertical plane. The retainer slot 52 is positioned forwardly of the support portion 50 in axial alignment therewith and is defined by a bottom wall 66, a pair of laterally spaced side walls 68 and 70, and a top wall 72. The bottom wall 66 of the retainer slot 52 is located in a common plane with the top surface 62 of the support portion 50.

As seen in FIGS. 2 through 4, the spirit level member 46 includes a clear and transparent plastic body main body portion 74 which is generally rectangular in cross section and is formed with chamber 76, the top portion of which is semi-cylindrical in configuration as seen in FIG. 3. The chamber 76 formed therein is filled with a viscous fluid entrapping a gas bubble which moves within the confines of the chamber. It will be noted that when the gas bubble is between the line markings 78 and 80 of the spirit level member, the headlamp body is in the desired aimed position about the horizontal aim axis A.

The forward end of the spirit level member 46 has the chamber 76 thereof closed by a cap portion 82 which has a threaded bore 84 centrally formed therein. The upper portion of the bore 84 opens into a counter-bore 86 formed in the upper part of the cap portion 82. The rearward end of the spirit level member 46 is integrally connected to the depending member 56 by the living hinge 58 which permits the main body portion 74 of the spirit level member 46 to pivot as will hereinafter be described. In addition, a circular aperture 88 is formed in the depending member 56 and is surrounded by an outwardly projecting guide ring 90 for purposes which will be more fully explained hereinafter.

Figure 5:
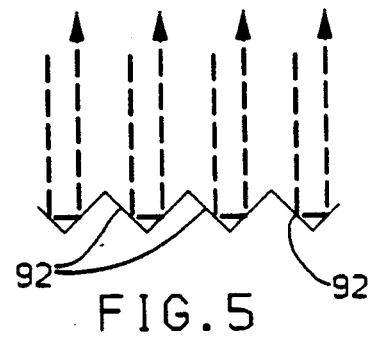
FIG. 5 is an illustration of light rays being reflected by the light directing surfaces formed on the bottom of the spirit level member as seen in FIG. 3.

As seen in FIGS. 2 and 3, the entire bottom surface of the main body portion 74 of the spirit level member 46 is formed with a plurality of V-shaped grooves 92 which extend the entire length of the main body portion 74 along axes parallel to the side walls of the main body portion 74. The grooves provide angled light directing surfaces which serve to direct light rays upwardly, as seen in FIG. 5, towards an observer viewing the spirit level member from above the headlamp assembly 10.

As aforementioned, the spirit level member 46 is supported by the carrier member 48 which, as seen in FIGS. 2 through 4, is L-shaped when viewed in elevation. The carrier member 48 is made from a plastic material and is formed with a pair of legs 94 and 96 located in mutually perpendicular planes with the leg 94 having a generally rectangular opening 98. A circular aperture 100 is formed in the leg 94 forwardly of the opening 98, and a similarly circular aperture 102 is formed in the leg 96 rearwardly of the opening 98. The forward end of the leg 94 has a generally square extension 104 integrally formed therewith which serves to support the clip member 54.

The clip member 54 is made from a metallic material and includes a body section 106 formed with a U-shaped slot 108 having a pair of identical and opposed arcuate notches 110 and 112 formed therein that are located on a common circle. The body section 106 is integrally formed with a reversely bent roof section 114, each side portion of which has a rearwardly and angularly outwardly extending spring arm 116. In addition, a tab 118 is formed with the roof section 114 that extends rearwardly and downwardly therefrom.

Figure 6:
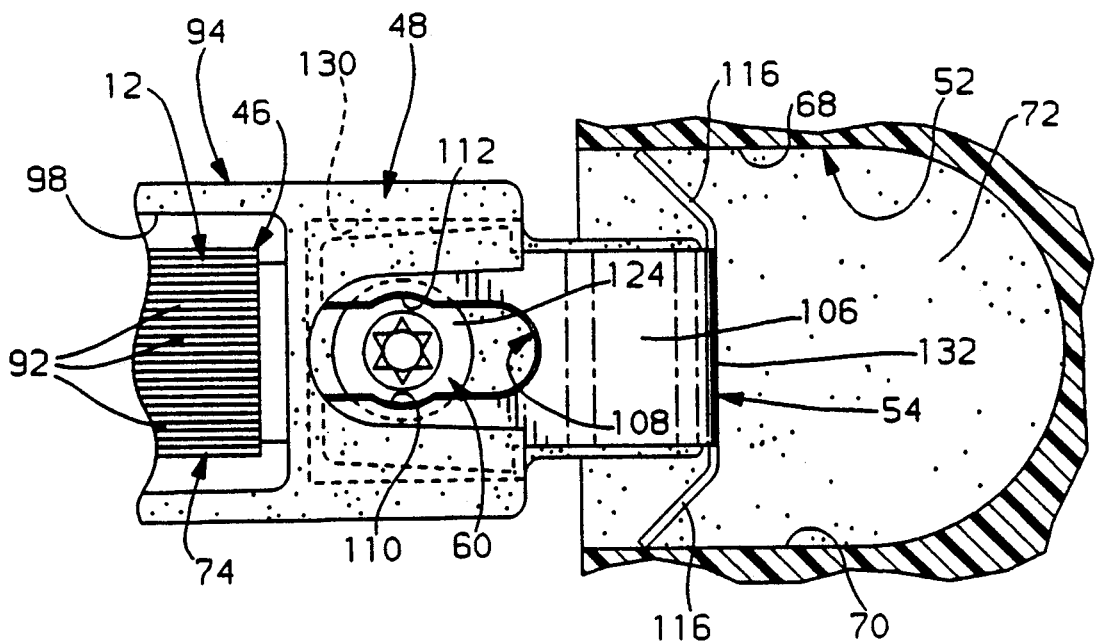
FIG. 6 is a view taken on line 6—6 of FIG. 2.

As best seen in FIG. 4, during assembly of the spirit level member 46 to the carrier member 48, the spirit level member 46 is first positioned on the carrier member 48 by initially having the depending member 56 vertically lowered into the area located between a pair of opposed nibs 120 and 122 and the inner surface of the leg 96. When the center of the guide ring 90 on the depending member 96 is axially aligned with the center of the aperture 102 in the leg 96, the guide ring 90 will move into the aperture 102, as seen in FIG. 2, and locate the threaded bore 84 in the cap portion 82 in vertical alignment with the aperture 100 in the leg 94. The adjustment screw 60, which has an enlarged head 124 formed with a threaded shank portion 126 terminating with a TORX driver portion 128, has the driver portion 128 move into the aperture 100 from the bottom of the leg 94 followed by rotation of the head 124 so that the shank portion 126 is threaded into the bore 84 formed in the cap portion 82 until the driver portion 128 of the adjustment screw 60 is located within the closed area formed by the counter-bore 86 as seen in FIG. 2. Afterwards, the clip member 54 is secured to the extension 104 on the leg 94 by having the rear end of the body section 106 move into a pocket 130 formed in the leg that partially surrounds the aperture. As seen in FIG. 6, as the rear end of the body section 106 moves into the pocket 130, it engages the spherical outer surface of the head 124 and the inward movement into the pocket continues until the arcuate notches 110 and 112 of the U-shaped slot 108 come into contact with the similarly shaped portion of the head 124. At the same time that the arcuate surfaces 110 and 112 engage head 124, the front end of the extension 104 will contact an end wall 132 (connecting the roof section 114 to the body section 106), and the tab 118 will contact the top surface of the extension 104. The tab 118 cooperates with a raised part of the body section 106 to grip the extension 104 therebetween and, in effect, lock the clip member 54 to the extension 104 while simultaneously providing an upward biasing force on the head 124 of the adjustment screw 60.

After the spirit level member 46 is assembled to the carrier member 48 as described above, it can then be attached to the reflector member 20 of the headlamp body 18. In this regard and as seen in FIGS. 2 and 4, the carrier member-spirit level member combination is placed on the surface 62 of the support portion 50 with the clip member 54 on the extension 104 in axial alignment with the retainer slot 52. The carrier member 48, together with the connected spirit level member 46, is then moved forwardly so that the roof section 114 and the spring arms 116 enter the retainer slot 52 and contact the top wall 72 and side walls 68, 70, respectively, of the retainer slot 52. It will be understood that during this inward movement into the retainer slot 52, the roof section 114 of the clip member 54 will be depressed downwardly towards the extension 104 and, similarly, the spring arms 116 will be deflected inwardly towards the extension 104. The inward movement into the retainer slot 52 will be continued until the leg 96 of the carrier member 48 contacts the surface 64 of the support portion 50. Afterwards, a fastener such as the screw 134 will be threaded into a dead-end bore 136 formed in the surface of the support portion 50 so that the carrier member 48 and spirit level member 46 combination is located on and secured to the support portion 50 of the reflector member 20 as seen in FIG. 2.

After the spirit level member-carrier member combination is attached to the headlamp body 18 as described above, the headlamp body 18 can be placed in a pre-set aiming fixture which, after one or the other light bulb 30 is energized, establishes the desired aimed position for the headlamp body 18. When such aimed position is realized, if the gas bubble of the spirit level member 46 is not located at the midpoint of the chamber between markings 78 and 80, a final tuning of the spirit level member 46 is attained by having an appropriate hand tool fitted to the driver portion 128 of the screw 60, and the latter is rotated in the proper direction to cause the gas bubble to move to the "level position" between the markings 78–80. During such adjustment, the head 124 of the screw 60 is maintained in position relative to the carrier member 48 by the clip member 54 while the main body portion 74 of the spirit level member 46 pivots about the living hinge 58.

Afterwards, the headlamp body 18 can be installed in a vehicle, and if the gas bubble is not located between the markings 78 and 80, indicating that it is correctly aimed, the headlamp body 18 can be properly aimed in the usual manner (while the vehicle is located on a level surface) by merely rotating the thumb wheels 42 and 44 associated with adjustment mechanisms 44 and 42, respectively, seen in FIG. 1, until the gas bubble of the spirit level member 46 is located at the midpoint of the chamber between the markings 78 and 80.

As alluded to hereinbefore, in instances where the support portion of the reflector member 20 is dark colored, it can, at times, be difficult to see the gas bubble of the spirit level member 46. In such case, however, the V-shaped grooves referred to hereinbefore serve to obscure the dark surface of the support portion and permit the gas bubble to be clearly visible.

Various changes and modifications can be made in the construction of the leveling arrangement described above without departing from the spirit of the invention. Such changes and modifications are contemplated by the inventors and therefore they do not wish to be limited except by the scope of the appended claims.

The embodiment of the invention in which an exclusive property or privilege is claimed are defined as follows:

1. A leveling and aiming arrangement for a vehicle headlamp having a reflector member provided with a reflector cavity for projecting a light beam substantially parallel to an optical axis of the reflector cavity, a support portion integrally formed with the reflector housing, a spirit level member carried by said support portion and having a main body portion made of a clear, transparent plastic material provided with a first end and a second end, the first end of said spirit level member including a portion provided with a threaded bore, the second end of said main body portion being provided with an outwardly projecting member which is fastened to the said support portion a living hinge serving to connect said projecting member to said second end of said main body portion of the spirit level member, screw means located in said threaded bore and engaging said support portion whereby rotation of said screw means causes the main body portion of the spirit level member to be pivotably adjusted about the living hinge and thereby allows the spirit level to be calibrated relative to the optical axis of the reflector cavity, and light directing means formed in a bottom surface of the main body portion adjacent to said support portion so when said support portion is dark colored, the light rays passing through said main body portion are reflected upwardly from said bottom surface to permit the gas bubble of the spirit level member to be readily visible to an observer.

2. The leveling and aiming arrangement set forth in claim 1 wherein the light directing means is a plurality of V-shaped channels located along axes parallel to the side walls of the main body portion of the spirit level member.

3. A leveling and aiming arrangement for a vehicle headlamp having a reflector member provided with a reflector cavity for projecting a light beam substantially parallel to an optical axis of the reflector cavity, a support portion integrally formed with the reflector housing, said support portion having a substantially horizontally oriented first surface and a substantially vertically oriented second surface, a carrier member located on said support portion, a spirit level member carried by said carrier member and having a main body portion provided with a first end and a second end, the first end of said spirit level member including a cap portion provided with a threaded bore with a counter bore, the second with of said main body portion being provided with a depending member which is fastened to said support portion, a living hinge serving to connect the depending member to said second end of said main body portion of the spirit level member, screw means having a head at one end thereof and a drive member at the other end thereof, said screw means having said head thereof adjacent the first surface of the support portion and extending into the threaded bore, whereby said drive portion is located within said counter bore formed in said cap, the arrangement being such that when the drive member of the screw means is rotated by a hand tool, the main body portion of the spirit level member is pivotably adjusted about the living hinge to thereby allow the spirit level to be calibrated relative to the optical axis of the reflector cavity.

4. The leveling and aiming arrangement as set forth in claim 3 wherein a bottom surface of said main body portion adjacent to said support portion is formed with light directing means so when said support portion is dark colored, the light rays passing through said main body portion are reflected upwardly from said bottom surface to permit the gas bubble in said spirit level member to be readily visible to an observer.

5. A leveling and aiming arrangement for a vehicle headlamp having a reflector member provided with a reflector cavity for projecting a light beam substantially parallel to an optical axis of the reflector cavity, a retainer slot formed in an upper portion of the reflector housing, said slot being defined by a bottom wall, a top wall and a pair of side walls, a support portion integrally formed with the reflector housing in axial alignment with said retainer slot, said support portion having a substantially horizontally oriented first surface and a substantially vertically oriented second surface, an L-shaped carrier member located on said support portion and having a pair of legs each of which is formed with an aperture, one of said pair of legs having a portion thereof located in said slot and the other of said pair of legs being located adjacent said second surface of said support portion, a spirit level member carried by said carrier member and having a main body portion provided with a first end and a second end, the first end of said spirit level member including a cap portion provided with a threaded bore with a counter bore vertically aligned with the aperture formed in said one of said pair of legs of said carrier member, the second end of said main body portion being provided with a depending member fastened to the second surface of said mounting portion through said other of said pair of legs of said carrier member, a living hinge serving to connect the depending member to said second end of said main body portion of the spirit level member, screw means having a head at one end thereof and a drive member at the other end thereof, said screw means having said head thereof adjacent the first surface of the mounting portion and extending through the aperture in said one of said pair of legs of the carrier member for threadable engagement with the threads of the threaded bore, whereby said driver portion is located within said counter bore formed in said cap, the arrangement being such that when the drive member of the screw means is rotated by a hand tool, the main body portion of the spirit level means is pivotably adjusted about the living hinge and thereby allows the spirit level to be calibrated relative to the optical axis of the reflector cavity.

6. The leveling and aiming arrangement set forth in claim 5 wherein said one of said pair of legs of said carrier member has a clip member fixedly connected thereto.

7. The leveling and aiming arrangement set forth in claim 6, wherein said clip member includes means formed therewith for maintaining said one of said pair of legs within said retainer slot and additional means for engaging the head of said screw and maintaining said head in position relative to said carrier member.

8. The leveling and aiming arrangement set forth in claim 6 wherein said clip member is formed with a pair of spring arms for engaging the side walls of the retainer slot.

* * * * *